No. 843,256. PATENTED FEB. 5, 1907.
G. F. BOWERSOX.
FISH DECOY OR LURE.
APPLICATION FILED MAR. 22, 1906.
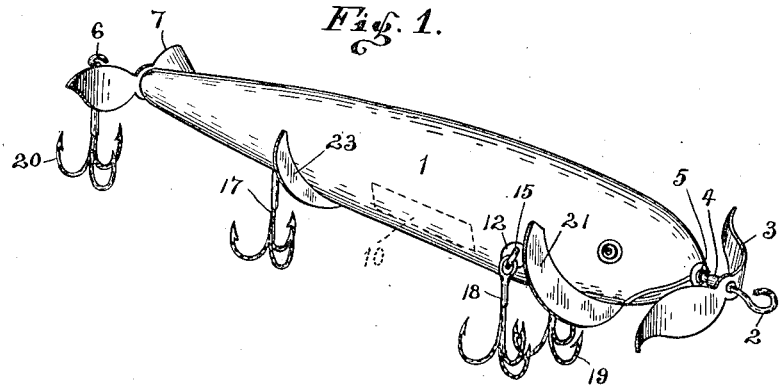
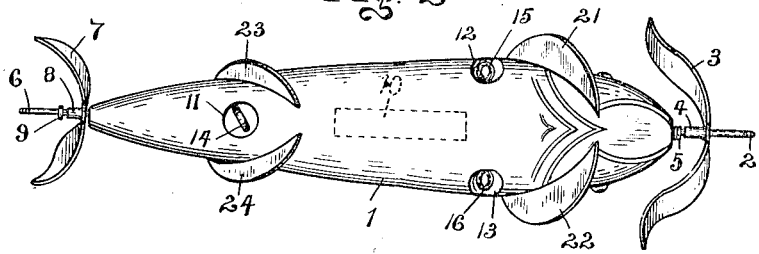
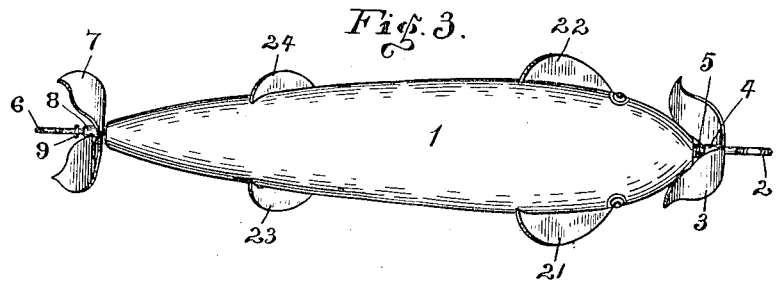
WITNESSES:
Adelaide Kearns
H. E. Randle
George F. Bowersox,
INVENTOR;
BY Robert W. Randle
ATTORNEY.

UNITED STATES PATENT OFFICE.

GEORGE F. BOWERSOX, OF PORTLAND, INDIANA.

FISH DECOY OR LURE.

No. 843,256.     Specification of Letters Patent.     Patented Feb. 5, 1907.

Application filed March 22, 1906. Serial No. 307,326.

*To all whom it may concern:*

Be it known that I, GEORGE F. BOWERSOX, a citizen of the United States, residing in the city of Portland, in the county of Jay, and in the State of Indiana, have invented new and useful Improvements in Submarine or Diving Fish Decoys or Lures, of which the following is a full and explicit specification, being such as will enable others skilled in the art to which it appertains to make and use the same with exactitude.

The object of my invention, broadly speaking, is to provide a fish decoy or lure of simple and inexpensive construction, practical and efficient in operation, strong and durable in its several parts, and which can be manufactured and sold at a comparatively low price.

A more particular object is the provision of a fish decoy or lure adapted to be operated by a troll-line and adapted when being trolled to travel below the surface of the water, thereby increasing its efficiency as a fish bait or lure; and, finally, my object is to provide a fish decoy or lure having means whereby it may be employed as a casting-bait, more particular reference being had to the means whereby it is caused to travel below the surface of the water when being trolled.

Other objects and particular advantages will be made manifest in the course of the ensuing specification.

The preferred embodiment of my invention is shown most clearly in the accompanying one sheet of drawings, in which—

Figure 1 is a perspective view of my invention. Fig. 2 is a plan view of the under side of the invention. Fig. 3 is a plan view of the upper side of the invention, and Fig. 4 is a detail view of one of the deflecting-fins.

Similar indices denote like parts throughout the several views.

In order that my invention may be more readily understood and its several advantages fully appreciated, I will now take up the detail description thereof and will refer to the various parts and the operations thereof as briefly and as compactly as I may.

The numeral 1 denotes the body of my invention, which is made to simulate a minnow and which is preferably formed of wood or other material whereby it will be buoyant and adapted to float on the surface of water. The said body portion should be suitably decorated and provided with apparent eyes, as shown, in order to give it the appearance of a minnow fish, the shape of the body and the decorations thereof being susceptible of various changes and modifications in order to suit the desires of the owner or the character of the fish which it is intended to attract thereby.

Extending out longitudinally from the nose of the body 1 is a screw-eye 2, having the usual threaded end, which is screwed into the body, the outer terminal eye, and the relatively long shank.

The numeral 3 designates the front spinner, which is formed of sheet metal and constructed to revolve when propelled through the water.

The numeral 4 denotes the hub, which is integrally connected to the center of the spinner, an aperture being formed in an axial direction through the hub 4 and centrally through the spinner for the shank of the screw-eye 2 to operate in, whereby the said spinner is mounted to revolve around the shank of the screw-eye 2. One or more washers 5, which are round in cross-section, are loosely disposed around the shank of the screw-eye 2 between the inner end of the hub 4 and the nose of the body 1 for the hub 4 to contact with in order to reduce the friction thereof.

Like unto the above, but extending out longitudinally from the rear end of the body 1, is a screw-eye 6, having the usual threaded end, which is screwed into the body, the outer terminal eye, and the relatively long shank.

The numeral 7 denotes the rear spinner, which is also formed of sheet metal and is integrally connected to its hub 8, an aperture being formed in an axial direction through the hub 8 and centrally through the spinner for the shank of the screw-eye 6, whereby the spinner is mounted to revolve. The washer 9 is secured around the shank of the screw-eye 6 for the rear end of the hub 8 to contact with.

Located approximately in the center of the lower portion of the body 1 is the ballast 10, (shown in dotted lines in Figs. 1 and 2,) its function being merely to retain the body right side up when in the water—that is to say, in the position shown in Fig. 1—the size of said ballast depending on the size and weight of the body, being formed, preferably, of lead or the like, and when in place should be entirely concealed.

The numerals 11, 12, and 13 designate the three cavities, formed as shown, the former located in the under side of the center of the rear portion and the other two being located in opposite sides of the forward portion of the body. In each of said cavities is inserted a screw-eye, being denoted by the numerals 14, 15, and 16, respectively. The threaded shanks of said screw-eyes are inserted into the body from the bottom of the respective apertures, and the eye portions thereof are disposed across in said cavities therefor, as shown, whereby they will not project out beyond the periphery of the body. Each of said screw-eyes is provided in this instance to carry pendent therefrom a group of hooks which are denoted by the numerals 17, 18, and 19, respectively, as shown in Fig. 1. Also a group of hooks 20 depend from the screw-eye 6, as indicated in Fig. 1.

The numerals 21 and 22 designate the forward blades or deflectors, and the numerals 23 and 24 designate the rear blades or deflectors, the form, position, and the relative inclination of these four blades or deflectors being an essential requisite to the success of this present invention. Each of said blades are formed crescent-shape, as shown in Fig. 4, and are made of sheet metal or the like and when in position are suggestive of fins for the representative fish or minnow. Said blades are disposed each at an angle of approximately forty-five degrees extending from the medial horizontal line on either side of the body and from there extending forward and downward to near the medial vertical line on the under side of the body, substantially as indicated. Slots are cut into the body, as by a fine saw, into which the blades are tightly inserted by percussion, being held in place by the tensibility of the material into which the slots are formed.

From the above it will be apparent that if a line be secured in the screw-eye 2 and the device be thrown into the water that the ballast will adjust the device to its normal position, as in Fig. 1, and then by drawing on the line the device will be drawn through the water, and by reason of the inclination of said blades or deflectors the body will be submerged, the depth at which it will travel below the surface of the water depending upon the speed at which it is caused to move.

I have herein attempted to set forth the best means to me known at this time for the accomplishment of the objects of my present invention in a simple and practical manner; but it is evident that various changes and variations in the details thereof may be made without departing from the principles thereof which are new and useful.

Having now fully shown and described my invention, what I claim, and desire to secure by Letters Patent of the United States, is—

1. In a fish decoy or lure the combination of the body simulating a minnow, spinners mounted to the front and rear of the body, groups of hooks depending from the body, and blades or deflectors extending out from both sides of the body their positions being such as to cause the entire device to be submerged when it is trailed in water, all substantially as shown and described.

2. A fish decoy or lure comprising a buoyant body made to simulate a minnow, spinners revolubly mounted to the front and rear ends of the body, and crescent-shaped blades or deflectors projecting out from both sides of said body their positions being such as to cause the device to be submerged when it is trailed in the water, all substantially as set forth.

3. A submarine or diving fish-decoy, comprising in combination, a buoyant body formed to represent a fish, spinners mounted to the front and rear of the body, groups of hooks depending from the body, a plurality of crescent-shaped blades projecting out from both sides of the body and disposed at corresponding angles sloping from their upper ends downward and forward to cause the device to submerge when it is trolled in water, all substantially as described.

4. A diving fish-lure comprising a wooden body made to resemble a minnow, spinners carried by the front and rear ends of the body, means whereby a troll-line may be connected to the front end of the body, hooks pendent from various parts of the body, a plurality of blades or deflectors extending out from each side of the body and disposed at corresponding angles with reference to each other to cause the device to travel below the surface of the water when being trolled.

5. A fish-decoy comprising in combination a buoyant body made to simulate a minnow, screw-eyes extending out longitudinally from the front and rear of the body, a spinner mounted on the shank of each of said screw-eyes, a group of hooks pendent from the rear screw-eye, groups of hooks pendent from the body, and blades extending out from each side of the body and disposed at corresponding angles extending from the medial horizontal line on each side of the body forward and downward to near the medial vertical line on the under side of the body to cause the body to submerge when being trolled.

In testimony whereof I have hereunto signed my name to this specification in the presence of two subscribing witnesses.

GEORGE F. BOWERSOX.

Witnesses:
 WALTER GAUNT,
 HARRY L. WILT.